United States Patent [19]
Hulbert

[11] Patent Number: 5,575,303
[45] Date of Patent: Nov. 19, 1996

[54] PROCESS FOR CONTROLLING A SERIES OF FLOTATION CELLS

[75] Inventor: David G. Hulbert, Johannesburg, South Africa

[73] Assignee: Mintek, South Africa

[21] Appl. No.: 337,760

[22] Filed: Nov. 14, 1994

[30] Foreign Application Priority Data

Nov. 19, 1993 [ZA] South Africa .......................... 93/7610

[51] Int. Cl.[6] .................................................. E03B 11/00
[52] U.S. Cl. .............................. 137/1; 137/255; 137/386
[58] Field of Search ............................... 137/1, 255, 386, 137/101.25, 571

[56] References Cited

U.S. PATENT DOCUMENTS 4,180,083  12/1979  Miyaoka et al. ..................... 137/255 X
4,332,507   6/1982  Wakamori et al. .................. 137/386 X

*Primary Examiner*—Kevin Lee
*Attorney, Agent, or Firm*—James Ray & Associates

[57] ABSTRACT

A process for controlling a variable in respect of material in a series of interconnected vessels of a plant includes monitoring a variable in respect of each vessel. The monitored value of the variable is compared with a set point value of the variable. The differences between the monitored values and set point values of the variable resulting from at least one disturbance are summed. When such a disturbance in any one vessel results in a signal representative of the summed value being generated, each of a plurality of actuators of the plant are manipulated in a predetermined direction from the one vessel to cause rapid reduction of the disturbance. The invention extends to a control system for controlling a variable in respect of material in a series of interconnected vessels of a plant.

9 Claims, 1 Drawing Sheet

PROCESS FOR CONTROLLING A SERIES OF FLOTATION CELLS

BACKGROUND OF THE INVENTION

THIS INVENTION relates to the control of a plant. More particularly, the invention relates to a process and control system for controlling a predetermined variable in respect of material in a series of interconnected vessels of a plant.

SUMMARY OF THE INVENTION

According to a first aspect of the invention, there is provided a process for controlling a variable in respect of material in a series of interconnected vessels of a plant, the process including monitoring a variable in respect of each vessel and comparing the monitored value of the variable with a set point value of the variable;

summing differences between said monitored values and set point values of the variable resulting from at least one disturbance; and when such a disturbance in any one vessel results in a signal representative of said summed value being generated, manipulating each of a plurality of actuators of the plant in a predetermined direction from said one vessel to cause rapid reduction of the disturbance.

The term "disturbance" means that the monitored value of the variable differs from a set point value of the variable by more than a predetermined amount i.e. a system deviation.

The process may include, prior to effecting the summing operation, scaling each variable by a suitable factor. Thus, the process may include obtaining predetermined characteristics of each vessel to obtain the factor.

The invention has particular application in the measurement of levels of material in the vessels. In this application, the factors may, for example, be surface areas of the vessels which are then summed to obtain a representative upstream "inventory".

The process may include summing said differences in a predetermined direction from each actuator and, when a disturbance is detected in respect of a variable in any one of the vessels, manipulating predetermined actuators in an appropriate direction from that vessel substantially simultaneously to facilitate rapid elimination of the disturbance from the plant.

Thus, in the case of level control, the process may be operable to sum the levels of the vessels upstream of the actuators and, when a disturbance is detected in a level upstream of one of the actuators, causing said one actuator and all the actuators downstream thereof to be manipulated to facilitate rapid reduction of the disturbance with a view to eliminating the disturbance.

For example, in the event of a single level being too high, as measured in a particular vessel, all other levels being correct, all actuators downstream of said particular vessel are manipulated together to cause the disturbance to pass rapidly through the plant to be eliminated. In other words, all the valves downstream of the disturbance are opened together and rapidly to facilitate rapid elimination of the disturbance from the system.

The process may include, initially, determining dynamic properties of each actuator to be taken into account when manipulating the actuators.

According to a second aspect of the invention, there is provided a control system for controlling a variable in respect of material in a series of interconnected vessels of a plant, the system including a measuring arrangement for measuring a variable in respect of each vessel in the plant;

a comparator for comparing a measured value of the variable of each vessel with a set point value;

a summing means for summing differences between the measured values and set point values of each vessel and for outputting a signal representative of said difference; and an actuator associated with each vessel, each actuator being responsive to the signal output from the summing means.

It will be appreciated that the summing means effectively sums errors in the measured variables.

The system may include a factoring means for factoring each measured variable into a form suitable to be summed. Thus, in the case of the measurement of levels of liquid in the vessels, the factoring means may be a surface area of the vessel which is multiplied with the measured level to provide a volume. Then, in the case of each actuator, the errors in the volumes in upstream vessels may be summed to provide the output signal which controls the actuator.

The system may further include a control arrangement, the control arrangement comprising a plurality of controllers, one controller associated with each actuator, for controlling the actuators. The controllers, which are responsive to said output signal, may, for example, be proportional-integral controllers.

Also, the system may include data storage facilities for storing data relating to dynamic properties of the actuators so that said properties can be taken into account by the controllers when controlling the actuators.

The invention is now described by way of example with reference to the accompanying diagrammatic drawings.

DETAILED DESCRIPTION OF DRAWINGS

Figure 1:
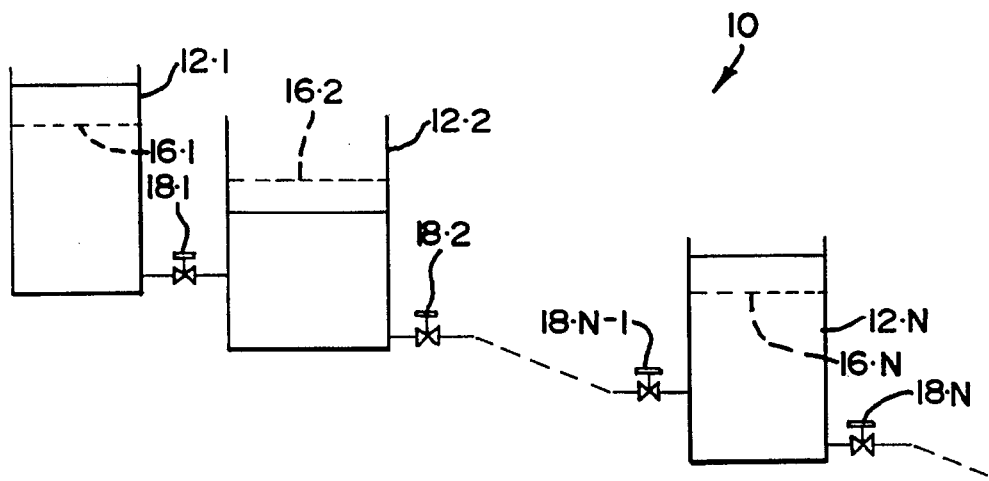
FIG. 1 shows a schematic representation of a plant to be controlled by a process in accordance with a first aspect of the invention.

Referring to the drawings, a plant to be controlled is illustrated, schematically, and is designated generally by the reference numeral 10. The plant 10 comprises a series of vessels 12.1 to 12.N.

Figure 2:
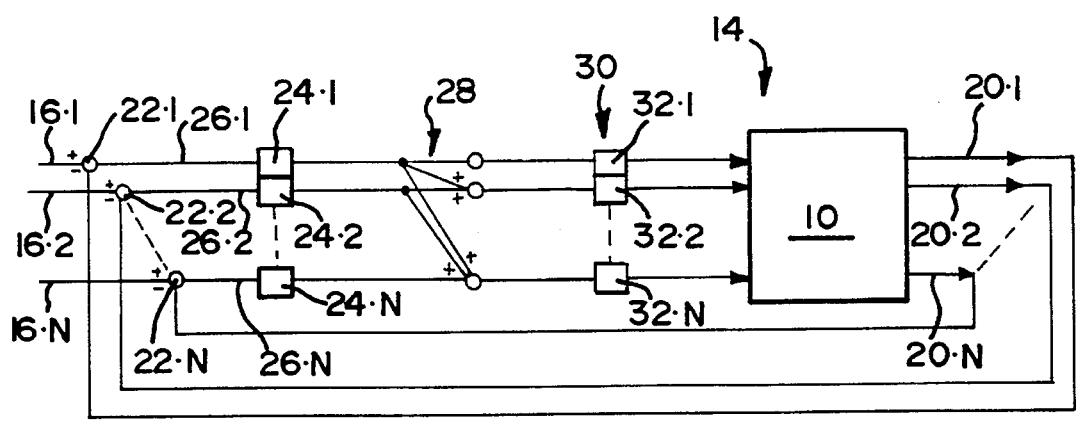
FIG. 2 shows a schematic block diagram of a control system, in accordance with a second aspect of the invention, of the plant.

Each vessel 12 contains a quantity of liquid therein and the levels of the liquid within the vessels are controlled via a control system 14 (FIG. 2).

A set point of the level of liquid within each vessel 12 is indicated by a dotted line 16.1 to 16.N.

Adjacent vessels 12 are in communication with each other via actuators in the form of valves 18.1 to 18.N.

In the case of level control of the liquid within the vessels 12, each vessel 12 has a level measuring instrument (not shown) associated therewith for measuring the level of liquid within the vessel 12. Signals representative of these level measurements are output on lines 20.1 to 20.N of the system 14. The measured levels are compared with the set point levels 16.1 to 16.N via comparators 22.1 to 22.N, respectively.

A factoring unit 24.1 to 24.N factors each error in level output by the comparators 22.1 to 22.N on lines 26.1 to 26.N. The factor, in the case of level measurement, is a factor representative of a surface area of the liquid within each vessel 12. Thus, the signal representative of the error in level is multiplied by the factor by its associated factoring unit 24 to provide an output signal which is representative of an error in the volume in each vessel 12. These errors in the volume are summed via a summation element 28 arranged downstream of the factoring units 24 so that the sums of the errors in volumes are provided to a controller arrangement 30. The controller arrangement 30 is in the form of a plurality of proportional-integral controllers 32.1 to 32.N. The controllers 32.1 to 32.N control the positions of the valves 18.1 to 18.N, respectively.

In use, as an initial step, the physical dimensions of the vessels 12 are obtained to provide the appropriate factors for the factoring units 24.1 to 24.N. The dynamic properties, such as a response time, of each valve 18, are also measured and are stored in data storage facilities of the control system 14.

By means of the measuring instruments of each vessel 12, the level of liquid within each vessel 12 is monitored. Signals representative of the measured levels are output on lines 20.1 to 20.N where the measured levels are compared with the set points levels 16.1 to 16.N via the comparators 22.1 to 22.N, respectively.

Any error in level output by a comparator 22.1 to 22.N is multiplied by the area factor of its associated factoring unit 24.1 to 24.N to provide an output signal representative of an error in volume of that particular vessel 12. The errors in the volumes are summed and the summed values are presented to each of the controllers 32.1 to 32.N, which then control their associated valves 18.1 to 18.N, respectively, either upstream or downstream of the valve 18.1 to 18.N with which the error is associated. Upstream values are used when there is a valve 18.N to control the discharge from the last vessel 12.N while downstream values are used where there is a valve (not shown) which controls the feed to the first vessel 12.1.

If, for example, a disturbance occurs in vessel 12.1 in that the level of liquid in that vessel exceeds its set point value 16.1, the summed value presented to each valve 18.1 to 18.N exceeds the summed set point value. Accordingly, with the control system 14 of the invention, all the valves 18.1 to 18.N open substantially simultaneously and rapidly so that equivalent amounts of the excess liquid in the vessel 12.1 are passed through the vessel 12.2 to 12.N to be eliminated from the system rapidly.

In another example, should liquid, via an appropriate conduit (not shown), be transferred from the vessel 12.2 to the vessel 12.1, the total sum of the liquid upstream of the actuator 18.2 (and, naturally, all valves 18 downstream of valve 18.2) is still the same. Accordingly, the valve 18.2 "sees" the correct volume of liquid upstream thereof and remains in its operative position.

However, upstream of valve 18.1, the level of liquid exceeds the set point level and, accordingly, the valve 18.1 opens rapidly to drain the excess liquid from the vessel 12.1 into the vessel 12.2. It will be appreciated that while this is occurring, the total volume of liquid upstream of valve 18.2 and the valves downstream thereof remains the same so that the operating positions of the valves 18.2 to 18.N are not affected and, accordingly, are not altered by the control arrangement 30.

In yet a further example, should the level of liquid in the vessel 12.1 exceed its set point while the level of liquid in the vessel 12.2 is below its set point, but by a lesser, absolute amount than the disturbance in the vessel 12.1, the system 14 is operable to cause all valves 18 downstream of vessel 12.2 to be opened as the summed inventory upstream of the valve 18.2 exceeds the set point level.

It will be appreciated that, in all the cases mentioned above, as the level in each vessel 12 reaches its required set point level 16, the valve 18 associated with that vessel 12 will adopt its correct operating position to minimise overshoot effects.

It is a particular advantage of the invention that a control system 14 is provided which results in a more rapid reduction in disturbances than with conventional control systems of which the Applicant is aware. Further, the plant 10 may have other transfers of materials (not shown) into, out of, or between vessels 12. Such transfers can give rise to disturbances for which effective compensation is provided by strong and rapid actions of the control system 14.

I claim:

1. A process for controlling distribution of a material in a series of interconnected vessels of a plant, the process including monitoring a variable representative of a quantity of material in each vessel and comparing a monitored value of the variable with a set point value of the variable;

summing differences between said monitored values and set point values of the variable resulting from at least one disturbance; and when such a disturbance in any one vessel results in a signal representative of said summed value being generated, manipulating each of a plurality of actuators of the plant in a predetermined direction from said one vessel to cause rapid reduction of the disturbance.

2. The process as claimed in claim 1 which includes, prior to effecting the summing operation, scaling each variable by a suitable factor.

3. The process as claimed in claim 2 which includes obtaining predetermined characteristics of each vessel to obtain the factor.

4. The process as claimed in claim 1 which includes summing said differences in a predetermined direction from each actuator and, when a disturbance is detected in respect of a variable in any one of the vessels, manipulating predetermined actuators in an appropriate direction from that vessel substantially simultaneously to facilitate rapid elimination of the disturbance from the plant.

5. The process as claimed in claim 1 which includes, initially, determining dynamic properties of each actuator to be taken into account when manipulating the actuators.

6. A control system for controlling distribution of material in a series of interconnected vessels of a plant, the system including a measuring arrangement for measuring a variable representative of a quantity of material in each vessel in the plant;

a comparitor for comparing a measured value of the variable of each vessel with a set point value;

a summing means for summing differences between the measured values and set point values of the variable in each vessel and for outputting a signal representative of said difference; and an actuator associated with each vessel, each actuator being responsive to the signal output from the summing means.

7. The system as claimed in claim 6 which includes a factoring means for factoring each measured variable into a form suitable to be summed.

8. The system as claimed in claim 6 which includes a control arrangement, the control arrangement comprising a plurality of controllers, one controller associated with each actuator, for controlling the actuators.

9. The system as claimed in claim 8 which includes data storage facilities for storing data relating to dynamic properties of the actuators so that said properties can be taken into account by the controllers when controlling the actuators.

* * * * *